United States Patent [19]

Negre

[11] Patent Number: 5,425,192

[45] Date of Patent: Jun. 20, 1995

[54] ELECTRONIC DISSUASIVE DEVICE FOR BIRDS

[75] Inventor: Gilles Negre, Le Plessis-Belleville, France

[73] Assignee: Spit Ecopic Line, Fontenay sous Bois, France

[21] Appl. No.: 124,822

[22] Filed: Sep. 21, 1993

[30] Foreign Application Priority Data

Sep. 22, 1992 [FR] France .................... 92 11563

[51] Int. Cl.$^6$ .......................................... A01M 29/00
[52] U.S. Cl. .......................................... 43/1; 116/22 A
[58] Field of Search ............... 43/1, 26.1; 361/232; 446/242, 243; 116/22 A; 40/430, 431, 455

[56] References Cited

U.S. PATENT DOCUMENTS

| | | | |
|---|---|---|---|
| 2,788,762 | 4/1957 | Wright | 116/22 A |
| 3,412,394 | 11/1968 | Lewis | 116/22 A |
| 4,598,660 | 7/1986 | Konzak | 116/22 A |
| 4,656,770 | 4/1987 | Nuttle . | |
| 4,745,859 | 5/1988 | Kyoung | 116/22 A |

FOREIGN PATENT DOCUMENTS

| | | |
|---|---|---|
| 3625773 | 9/1987 | Germany . |
| 8905067 | 9/1989 | Germany . |
| 3903684 | 8/1990 | Germany . |
| 63-317036 | 12/1988 | Japan . |
| 2-79927 | 3/1990 | Japan . |
| 2254464 | 10/1992 | United Kingdom . |
| 2255217 | 10/1992 | United Kingdom . |
| 2255217A | 10/1992 | United Kingdom ............ 116/22 A |

OTHER PUBLICATIONS

European Patent Office Abstracts of Japan, vol. 13, No. 158 (C-568) Apr. 17, 1989–Abstract for Japanese patent JP63317036 (published Dec. 26, 1988).

European Patent Office Abtracts of Japan, vol. 14, No. 270 (C-727) Jun. 12, 1990–Abstract for Japanese patent JP279927 (published Mar. 20, 1990).

*Primary Examiner*—Kurt Rowan
*Attorney, Agent, or Firm*—Donald J. Pagel; Jeffrey P. Aiello

[57] ABSTRACT

The device comprises a housing featuring a transparent window behind which is positioned an infrared detector. A disc in the same plane as that of the front face of the housing can rotate around its central axis perpendicular to said plane. The visible side of the disc shows a pattern of a color in contrast with that of the disc, such as black over white background or vice-versa. If the infrared detector signals the presence of a heat-emitting source, such as the one given out by the body of a bird on a surface to be protected, a dissuasive process for birds is activated which combines disc rotation and sound emission. The disc rotation creates the illusion of the presence of the eye of a bird of prey, while the sound emission includes cries like those of birds in distress, or cries or a feared bird of prey.

17 Claims, 3 Drawing Sheets

ELECTRONIC DISSUASIVE DEVICE FOR BIRDS

BACKGROUND OF THE INVENTION

1. Field of the Invention

The present invention relates to a device for dissuading birds from alighting on certain surfaces, and more particularly to a device that includes a rotating image for frightening the birds.

2. Description of the Prior Art

It is well known that birds often try to alight on the outer structures of buildings, such as window sashes, sills, ledges, statues, wall ridges, roof gutters, portals, bridges, towers and masts.

This alighting and resting is a nuisance in that the birds, through their droppings, dirty and damage not only the landing surface, but also all outer structures of the building that are underneath.

Due to aesthetic reasons, and also to avoid irreversible damaging of the structure material, one is often obliged to deal with frequent and expensive renovation work of the damaged parts of the building.

One of the most efficient ways of preventing this nuisance consists in covering surfaces on which birds alighting is not welcome, with a device comprising a bottom base support from which extend upwardly birds dissuasive spike elements. Such a device is described in European patent application number 0 340 108, published on Nov. 2, 1989.

Such a device, however, is not fit for larger surfaces because of cost. Additionally, for obvious reasons, such devices are not suitable for surfaces utilized by people, such as balconies. For those surfaces, other systems have been developed which work on the principle of either simulating an object which frightens the bird, such as a human-like silhouette ("scarecrow effect), or of emitting a signal (e.g. ultrasound or hyperfrequency) which is physiologically bothersome to the birds. The drawbacks of the latter system are particularly the development cost, the difficulty in calibrating a really bothering signal, and the nuisance induced for men and domestic animals next to the protected surfaces. Another drawback of both systems is that they only bother the birds which progressively get used to them, rendering the protection inefficient sooner or later.

SUMMARY OF THE INVENTION

It is therefore an object of the present invention to disclose a device having none of the above-mentioned drawbacks. The device according to the present invention, comprises a housing having a transparent window behind which is positioned an infrared detector. A disc in the same plane as that of a front face of the housing can rotate around its central axis perpendicular to said plane. The visible side of the disc shows a pattern of a color in contrast with that of the disc, such as black over white background, or vice-versa. If the infrared detector signals the presence of a heat-emitting source, such as the one given out by the body of a bird on a surface to be protected, a dissuasive process for birds is activated which combines disc rotation and sound emission.

The disc rotation creates the illusion of the presence of the eye of a bird of prey, by utilizing concentric rings which vary in color (for example white, grey, black, etc.), radius and intensity according to the rotation speed.

The sound emission includes cries, such as of birds in distress, or cries of a feared bird of prey.

One fully efficient and inexpensive embodiment of the invention does not comprise the sound emission: the dissuasive effect consists only in the illusion of the eye of a bird of prey by rotation of the disc.

More particularly, the present invention comprises a dissuasive device for birds comprising a frame, a mobile part susceptible of being rotated by reference to the frame, and showing a pattern simulating the eye of a bird of prey when the mobile part is rotating, a system locked to the frame, for rotating the mobile part, an electrical power supply, means for detecting the presence of birds, and means for activating the rotating system at a first frequency and for a first duration, when the presence of a bird is detected.

BRIEF DESCRIPTION OF THE DRAWINGS

The invention will be better understood from the following detailed description read in conjunction with the following drawings.

DETAILED DESCRIPTION OF THE PREFERRED EMBODIMENT

Figure 1:
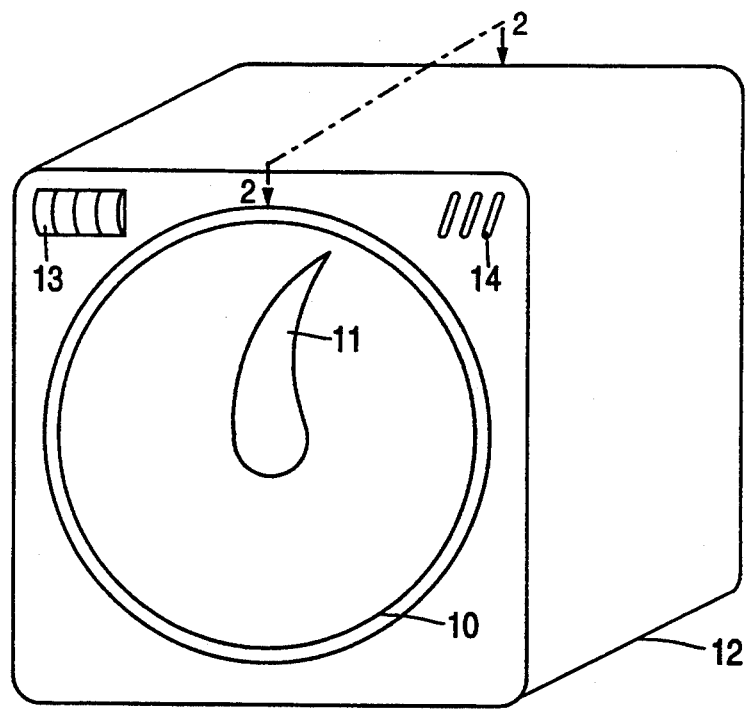
FIG. 1 is a perspective view of the device according to the present invention.

FIG. 1 is a perspective view of an electronic dissuasive device for birds. The electronic dissuasive device is composed of a housing 12, cast or otherwise assembled according to any known technique for ensuring watertightness and protection for inner electrical and mechanical elements.

Figure 3:
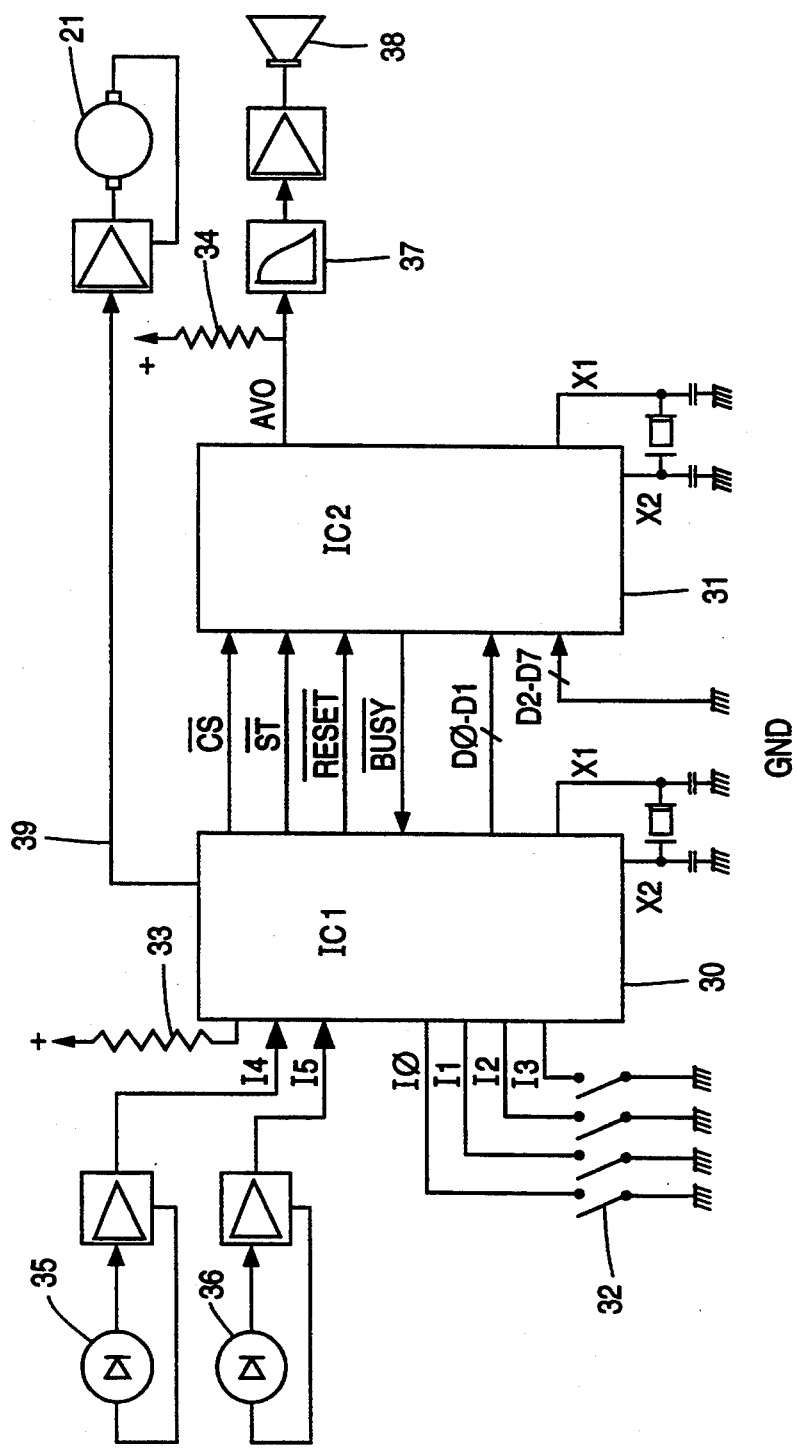
FIG. 3 is an electronic schematic of the present invention.

The housing features a transparent window 13 behind which is positioned an infrared detector 35 described with respect to FIG. 3. The housing also features an opening 14 in front of an inner loudspeaker 38 (shown in FIG. 3). The latter opening can be omitted if the embodiment of the invention does not include the loudspeaker 38, as explained below. A disc 10 in the same plane as that of the front face of the housing can rotate around its central axis perpendicular to said plane. The visible side of the disc shows a pattern 11 of a color in contrast with that of the disc, such as black over a white background, or vice-versa.

The shape of the pattern 11 (a coma) shown in FIG. 1 is merely illustrative. Other shapes for the pattern 11 could also result in the desired effect of simulating the eye of a bird of prey in motion. For example, by the use of concentric rings, the color (e.g. white, grey, black), the radius and the intensity of which vary according to the rotation speed. Shape, dimensions and colors of the housing are not critical, and can be those of a cube having edges of 15 cm, and a color identical to that of the disc.

The housing is equipped with feet or any other fixing system (not shown) so as to allow steady positioning of the dissuasive device next to the surface to be protected, or for hanging onto a wall, a tree branch, etc.

Figure 2:
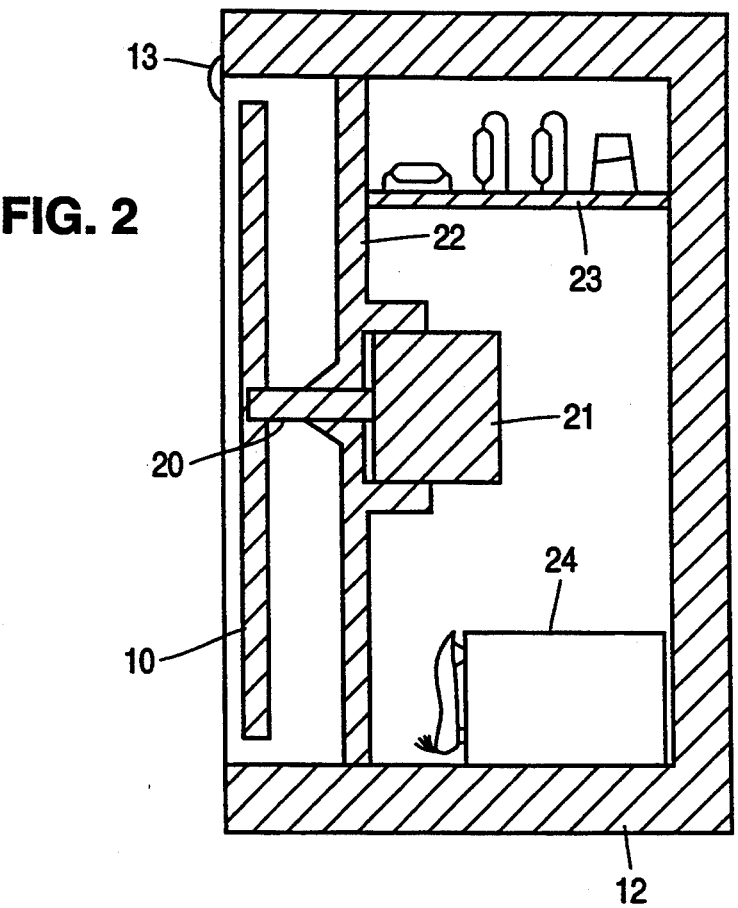
FIG. 2 is a cross-sectional view taken along the line A—A of FIG. 1.

FIG. 2 is a cross-sectional view taken along the line A—A of FIG. 1. The housing 12 features a frame 22, which is bound to it. The housing 12 and frame 22 may be formed from a single piece out of a cast, or be assembled together, according to any known technique. A motor 21 is fastened to the frame, as well as a printed circuit 23 on which are placed the electronic components of the device, and a battery 24. Electrical connections between the above elements are not shown. It will be obvious to one skilled in the art that the disclosed arrangement of elements is not decisive. The motor 21 has an axis 20 allowing to rotate the disc.

In the preferred embodiment, a battery (rechargeable battery or not) is utilized as the source of energy. However, any other source allowing autonomous functioning of the device, such as that provided by small solar panels according to known techniques, may also be used. When the source of energy is that of the house power, the device is not autonomous anymore, but this type of functioning is also covered by the present invention because one skilled in the art knows how to convert AC high voltage into DC low voltage so as to provide power to the electronic components of the device.

FIG. 3 is an electronic functional schematic of the present invention. Chosen components can preferably be the circuits having as reference 1710X for IC1, and 775X for IC2, available from the "NEC" (trademark) Company. Details of implementing and functioning of these circuits are therefore fully accessible to one skilled in the art.

IC1 is a microcontroller 30 capable of executing a sequence of instructions corresponding to the process explained below. It features inputs I0 to I5 and $\overline{BUSY}$, and outputs D0 and D1, as well as $\overline{CS}$, $\overline{ST}$, $\overline{RESET}$, and 39. The power-on information is conveyed through a resistor 33. The microcontroller 30 has an oscillator and capacitors between its inputs X1 and X2 following a well-known technique (for example at a frequency of 640 kHz). An on input I4 is available for the amplified and rectified output signal of a known infrared detector 35. An on input I5 is available for the amplified and rectified output signal of a daylight detector 36. The latter detector, not shown on FIG. 1 or FIG. 2, is placed on one of the upper faces of the housing. Four switches 32 allow the microcontroller 30 to be programmed (one combination amongst 16) through I0 to I3. Output 39 allows a signal, after amplification, to command rotation of motor 21.

IC2 is a sound synthesizer 31, capable of generating (depending on command circuit 30) a choice of prerecorded sounds. The prerecorded sounds are recorded using a system, available for example from the "NEC" Company, that allows digitalization, signal compression and programming of IC2 following techniques well-known to one skilled in the art. IC2 features outputs $\overline{BUSY}$ and AVO, and inputs D0 to D7, as well as $\overline{CS}$, $\overline{ST}$, $\overline{RESET}$.

The power-on information is conveyed through lead $\overline{RESET}$ activated by microcontroller 30. Sound synthesizer 31 has an oscillator and capacitors between its inputs X1 and X2 (for example at a frequency of 640 kHz). Inputs D2 to D7 are grounded as non utilized. Output AVO connected to electrical power through resistor 34, allows activating a loud-speaker 38, through a low-pass filter 37 and after amplification.

All electronic components of the present device are powered by the battery 24 and a voltage regulator (not shown).

Figure 4:
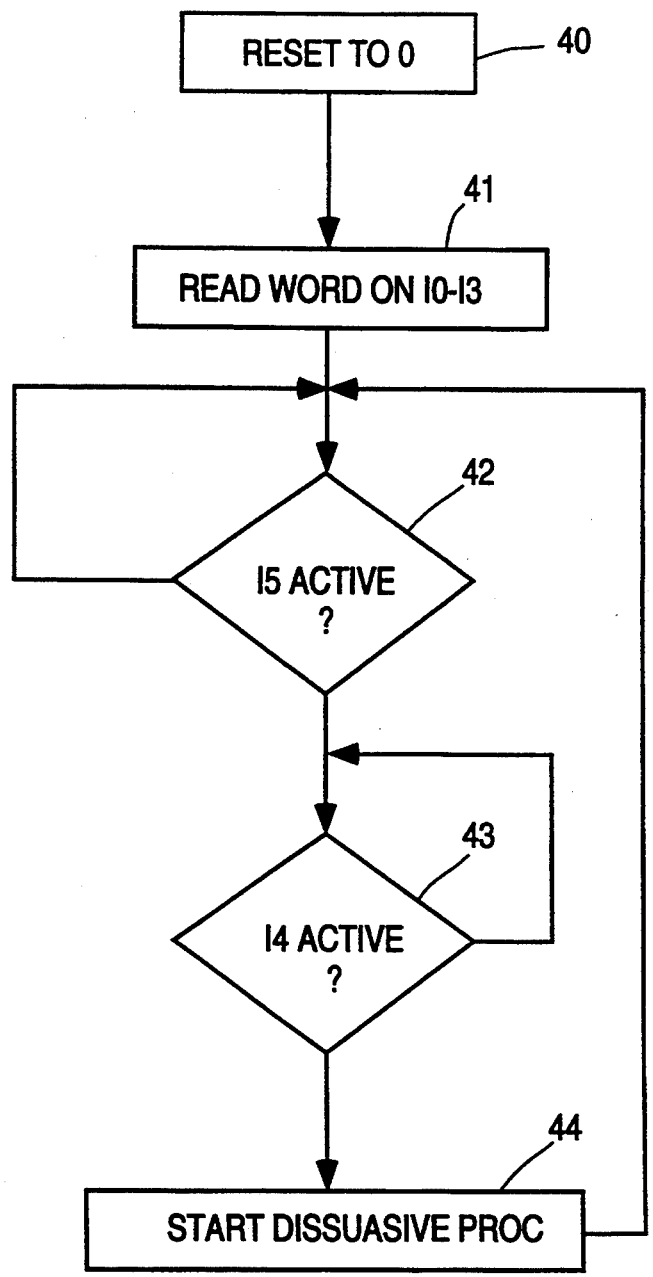
FIG. 4 is a flow chart listing functional steps associated with the electronic schematic of FIG. 3.

The functioning of the electronic schematic will further be explained with FIG. 4. The latter figure represents the functional process associated with the electronic schematic of the present invention. First step 40 consists in a reset to zero of the various internal counters of circuits 30 and 31. This step is processed at power-on of the device, when the battery is replaced, or when a switch (not shown) accessible from the outside of the housing, and imbedded in the power supply circuitry, is activated. A second step 41, consists for circuit 30 in reading the programmed word on its inputs I0 to I3: the latter word will determine the choice of one dissuasive process amongst 16 as is discussed below.

Next step 42 consists in making sure that input I5 is active, i.e. that functioning of the device is required when, in daylight only, birds can show up and it is intended to dissuade them from alighting on certain surfaces. As soon as I5 becomes active, circuit 30 checks at step 43 whether the infrared detector has signaled, by activating I4, the presence of a heat source such as the one provided by the body of a bird on the surface to be protected. As soon as it is signalled, the proper dissuasive process itself starts at step 44.

The dissuasive process consists in one amongst 16 alternatives, combining various durations (circuit 30 features internal timers) and frequencies of command of the motor by lead 39, and of durations and choices of one prerecorded sound amongst 4 through leads D0 and D1, CS and ST. Variations in the frequency of the command of the motor result in variations of disc rotation speed, so as to bring about the illusion of the dynamic of an eye in motion. One prerecorded sound can be, for example, the cry of a bird in distress, or that of a feared bird of prey. Switches 32 allow choice of which amongst the dissuasive possibilities, can be accessible to a user of the device who looks for the alternative dissuasive process working best against the kind of bird he wants to get rid of. It will be obvious to one skilled in the art that the given number of switches (4) is purely indicative, and governs the number of dissuasive alternatives. Superimposing random generation can also be effective in that the birds do not get accustomed to the device.

One fully efficient and inexpensive embodiment of the invention does not include the circuit 31, nor filter 37 or loud-speaker 38. In this alternative embodiment, the dissuasive effect consists only in the illusion of the eye of a bird of prey by rotation of the disc. The daylight detector 36 can also be omitted.

In another embodiment, the disc is replaced by a system opening out under centrifugal force when in rotation, also showing a pattern 11, which contributes even more to the dynamic of the illusion.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A dissuasive device for birds comprising:
   a watertight housing;
   a mobile part positioned inside of the housing, the mobile part being visible from outside of the housing;
   a rotation means for rotating said mobile part in a circular motion, the rotation means being positioned inside of the housing and being mechanically coupled to the mobile part;

an electrical power supply means electrically coupled to the rotation means for providing power thereto;

a pattern displayed on the mobile part comprised of a design that frightens birds when the mobile part is rotated by the rotation means;

detection means for detecting the presence of a bird in the vicinity of the detection means; and control means electrically coupled to the detection means and to the rotation means for causing the rotation means to rotate at a first frequency and for a first duration of time when the bird is detected by the detection means.

2. The dissuasive device of claim 1 further comprising:

sound means for generating a prerecorded sound at a second frequency and for a second duration when the presence of a bird is detected.

3. The dissuasive device according to claim 1 further comprising:

daylight sensing means for preventing activation of the detection means in the absence of daylight.

4. The dissuasive device according to claim 1 wherein the mobile part is a planar disc, and the pattern is a coma of a color contrasting with that of the disc and extending from the center of said disc.

5. The dissuasive device according to claim 1 wherein the detection means comprises an infrared detector.

6. The dissuasive device according to claim 1 further comprising:

first programming means for programming values of said first frequency and said first duration.

7. The dissuasive device according to claim 2 further comprising:

second programming means for programming values of said second frequency and said second duration.

8. The dissuasive device according to claim 1 wherein the values of said first frequency and said first duration vary randomly.

9. The dissuasive device according to claim 2 wherein the values of said second frequency and said second duration vary randomly.

10. The dissuasive device according to claim 1 wherein the electrical power comprises a battery.

11. A dissuasive device for birds comprising:

a housing having a longitudinal axis;

a planer disc member positioned inside of said housing and adapted to rotate perpendicular to the longitudinal axis of said housing, said disc member having a pattern thereon adapted to frighten a bird when said disc member is rotating;

motor means coupled to said disc member for rotating said disc member perpendicular to the longitudinal axis of said housing;

an electrical power supply coupled to said motor means for providing power thereto;

detection means for generating a detection signal in response to the presence of a bird in the vicinity of the detection means;

activation means electrically coupled to said detection means and to said motor means for activating said motor means at a specified frequency for a specified duration of time when the detection signal is received by said activation means; and programming means for allowing said specified frequency to be changed to a different frequency.

12. The device of claim 11 wherein the detection means comprises an infrared sensor.

13. The device of claim 11 wherein the activation means comprises a microcontroller.

14. The device of claim 11 wherein the electrical power supply comprises at least one battery.

15. The device of claim 11 further comprising:

sound means electrically connected the activation means for providing a noise that frightens said bird in response to an electrical signal from the activation means.

16. The device of claim 11 wherein said pattern comprises a coma of having a color contrasting with that of said disc member, said pattern extending from the center of said disc member.

17. A dissuasive device for birds comprising:

a housing;

a mobile part positioned inside of the housing, the mobile part having the shape of a disk;

a pattern displayed on the mobile part, the pattern comprising a coma-shaped figure that extends outward from the center of the mobile part;

rotation means for rotating said mobile part, the rotation means being mechanically attached to the housing and mechanically coupled to said mobile part;

an electrical power supply electrically coupled to the rotation means for providing power thereto;

detection means for detecting the presence of a bird in the vicinity of the detection means;

control means electrically coupled to said detection means and to said rotation means for causing said rotation means to rotate at a specified frequency and for a specified duration of time when the bird is detected by the detection means;

sound means for generating prerecorded sounds when the presence of the bird is detected by the detection means; and daylight sensing means for preventing activation of the detection means in the absence of daylight.

* * * * *